(12) United States Patent
Foerster

(10) Patent No.: US 7,569,506 B2
(45) Date of Patent: Aug. 4, 2009

(54) METHOD FOR REGENERATING IRON-LOADED DENOX CATALYSTS

(75) Inventor: Marcel Foerster, Oldenburg (DE)

(73) Assignee: CESI-Tech Technologies, Inc., Gilbert, AZ (US)

( * ) Notice: Subject to any disclaimer, the term of this patent is extended or adjusted under 35 U.S.C. 154(b) by 460 days.

(21) Appl. No.: 10/526,336

(22) PCT Filed: Sep. 4, 2003

(86) PCT No.: PCT/EP03/09794

§ 371 (c)(1),
(2), (4) Date: Nov. 3, 2005

(87) PCT Pub. No.: WO2004/022226

PCT Pub. Date: Mar. 18, 2004

(65) Prior Publication Data

US 2006/0148639 A1 Jul. 6, 2006

(30) Foreign Application Priority Data

Sep. 5, 2002 (DE) ................. 102 41 004

(51) Int. Cl.
*B01J 38/60* (2006.01)
*B01J 23/92* (2006.01)

(52) U.S. Cl. .......................... 502/27; 502/20

(58) Field of Classification Search ................. 502/20, 502/27
See application file for complete search history.

(56) References Cited

U.S. PATENT DOCUMENTS

| 2,380,731 | A | | 7/1945 | Drake et al. ................. 252/239 |
| 4,615,991 | A | | 10/1986 | Obayashi et al. ............. 502/28 |
| 4,830,997 | A | * | 5/1989 | Trinh et al. ................... 502/28 |
| 4,914,256 | A | | 4/1990 | Rodewald .................... 585/726 |
| 5,099,014 | A | * | 3/1992 | Young ......................... 540/145 |
| 6,080,696 | A | * | 6/2000 | Duke et al. ................... 502/27 |
| 6,136,222 | A | * | 10/2000 | Friesen et al. ............... 252/184 |
| 6,241,826 | B1 | | 6/2001 | Dittmer et al. ................. 134/1 |
| 2001/0006929 | A1 | | 7/2001 | Budin et al. .................. 502/24 |

FOREIGN PATENT DOCUMENTS

| EP | 0 910 472 B1 | 1/1998 |
| JP | 10 156192 A | 6/1998 |

OTHER PUBLICATIONS

International Search Report in PCT international application PCT/EP03/09794 (corresponding to this current application, which is a national stage filing thereof), mailedDec. 29, 2003, four pages in length, citing certain references listed above.

* cited by examiner

*Primary Examiner*—Timothy C Vanoy
*Assistant Examiner*—Daniel Berns
(74) *Attorney, Agent, or Firm*—Womble Carlyle

(57) ABSTRACT

The invention relates to a method for regenerating DeNOx catalysts having an increased $SO_2/SO_3$ conversion rate as a result of the cumulation of iron compounds, and is characterized in that the catalysts are treated with an essentially aqueous acid solution, preferably having a pH between 0.5 and 4, and with an addition of antioxidants.

14 Claims, No Drawings

METHOD FOR REGENERATING IRON-LOADED DENOX CATALYSTS

BACKGROUND OF THE INVENTION

The invention relates to a method for the regeneration of iron-loaded denox catalysts.

During the production of current using fossil fuels exhaust gases are obligatorily produced that contain in particular nitrogen oxides and sulfur dioxides in addition to fine dust as environmentally harmful compounds. The exhaust gases must therefore be cleaned from these compounds to the extent possible before they can be put into the environment, that is, in other words a desulphurization as well as a denitration and a removal of fine dust by filters are necessary. The desulphurization is carried out according to different methods in which basically the $SO_2$ produced in the combustion is oxidized to $SO_3$, then absorbed in alkaline solution and finally removed usually in the form of gypsum. The denitration is carried out parallel to the above during which nitrogen monoxide with ammonia and atmospheric oxygen is converted to elementary nitrogen and water and nitrogen dioxide also reacts with ammonia and atmospheric oxygen to elementary nitrogen and water. This reaction requires catalyst designated as so-called denox catalysts. These are catalysts with a glass fiber body or catalysts with different shapes, preferably honeycomb-shaped or plate-shaped, based on titanium dioxide and containing the oxides of various transition metals such a vanadium, molybdenum and tungsten as active components.

The effectiveness of such catalysts decreases after an operating time of, e.g., on the order of 30,000 hours as a function of which fuel is used in the power plant, which is conditioned on the one hand by fly ash settling in and/or clogging the catalyst passages and on the other hand by the formation of blocking layers by the ammonium sulfate formed during the denitration and in addition by a toxification of the active centers by elements or compounds such as, e.g., arsenic, phosphorus or metals contained in the exhaust gas.

A special problem is posed by the reduction of performance by the undesirable elevation of the $SO_2/SO_3$ in the denitration range by iron compounds. When coal is used as fuel it must be taken into consideration that coal can contain a not insignificant amount of mineral components, depending on its age and origin, and the iron content can be in a range of usually 5 to 7 or 8 wt. % relative to the total amount of the mineral components.

Iron compounds not only settle permanently mechanically in the catalyst on the surfaces but also enter into chemical reactions with the catalytic components, thus resulting in a diminution of the catalytic performance during denitration.

The removal of metals from denox catalysts while retaining structure and activity is described, e.g., in DE 43 00 933 in which two different gaseous phases are used. However, this method is not suitable for removing other pollutants from the catalyst. All previously known methods for the regeneration of denox catalysts that operate with reaction liquids such as, e.g., EP 0 910 472; U.S. Pat. No. 6,241,826; DE 198 05 295; DE 43 00 933; EP 0 472 853; U.S. Pat. No. 4,914,256 cannot specifically remove iron. That is, in other words, there was previously no possibility of treating catalytic disturbances in the form of an elevation of the $SO_2/SO_3$ conversion rate due to iron.

SUMMARY OF THE INVENTION

The invention therefore has the problem of developing a method that makes possible the specific removal of iron from denox catalysts.

Investigations have shown that the iron compounds present on the catalyst, that contain primarily bivalent iron, are converted into trivalent iron by the oxygen content present in the exhaust gas, which severely impairs the dissolving behavior. It should be considered during a specific removal of iron compounds that denox catalysts comprise cation exchange properties that can result in special bonds and exchange reactions.

Therefore, in order to solve the problem a method for the regeneration of denox catalysts is suggested in which the catalyst is treated with a substantially aqueous acidic solution with an addition of antioxidants.

It was surprisingly found that the joint use of an acid and an antioxidant make possible a removal of iron compounds down to the desired low $SO_2/SO_3$ conversion rate, and that, in addition, a performance of the catalysts can be regained by adapting the concentrations of acid and antioxidant that is in the same range as or even exceeds the range of catalysts that are new from the factory.

DETAILED DESCRIPTION OF THE INVENTION

Since the catalysts to be regenerated originate from different power plants using coal of various origins and qualities as fuel, an analysis of the chemical composition of the catalyst and of its degree of contamination is absolutely necessary prior to carrying out the method. It is readily possible for an expert in the art, using the analysis values and the contents of disturbing iron compounds, to determine the required concentrations of reaction liquid in any previous and subsequent processing steps in advance and to adapt them to the particular situation.

As a rule, catalysts that must be regenerated are heavily loaded with dust so that a mechanical pretreatment for the removal of fly ash from the catalytic surfaces and passages by using industrial vacuum cleaners or compressed air has proven to be usually necessary. For the case in which the catalysts have a thick blocking layer of salts such as ammonium sulfate a treatment with water can also take place in order to dissolve these blocking layers. If the blocking layers contain salts that are difficult to dissolve in water such as calcium sulfate the water treatment can take place with the addition of ultrasound.

The catalysts are placed in a reaction solution substantially representing an aqueous solution of an inorganic organic acid with an addition of one or more antioxidants. If necessary, this solution can contain a certain addition of polar, organic solvents such as, e.g., alcohols, depending on the type of contaminations present.

Inorganic acids are preferably used as aqueous acidic solution, namely, hydrochloric acid, phosphorus acid, nitric acid and in particular sulfuric acid. The solutions are diluted in such a manner that a pH between 0.5 and 4.0 results. The work is performed as a rule at a pH of approximately 2, in particular 1.9, which corresponds to a molar solution of approximately $1/100$. Instead of inorganic acids, relatively strong organic acids can also be used that are comparable as concerns the result of the effectiveness of the regeneration but are not used, as a rule, on account of their high price. Usable acids are, e.g., oxalic acid, citric acid, malonic acid, formic acid, chloroacetic acids or benzole sulfonic acid. If necessary, mixtures of the cited acids can also be used.

Antioxidants in amounts of 0.1 to 5.0, preferably between 0.2 and 2.0 wt. % are added to the aqueous acid. E.g., the following substances are used as antioxidants: substituted phenols including phenolic carboxylic acids, hydroquinones, catechols, and/or inorganic or organic, aliphatic, aralphatic or aromatic mercapto compounds, dithiocarbonates, hydroxycarboxylic acids or enediols and/or phosphates or phosphonates, which also includes salts, esters, metal complexes or mixtures of such compounds.

Normal hydroquinone and catechol as well as substituted phenols, namely gallic acid and gallates and in particular ascorbic acid, that is an effective antioxidant on account of its enediol structure, have proven to be particularly advantageous.

Moreover, the reaction solutions preferably contain a certain addition of surfactants, which can be anionic, cationic, amphoteric, non-ionic or zwitterionic surfactants that improve the wettability of the catalytic surfaces and the penetration of the reaction liquid into the pores of the catalyst. The addition of surfactants takes place in a concentration of approximately 0.01 to 0.2 wt. %.

While the method is being carried out the catalytic module, optionally after mechanical pre-cleaning, is immersed in the reaction solution, in which it can remain for a period of 5 minutes to approximately 24 hours as a function of the degree of contamination and additional treatment. In order to shorten the treatment time the temperature of the solution, that can be in principle between the ambient temperature and higher values up to 100°, should be raised, preferably to approximately 60° C. Moreover, the treatment time can be shortened and the effectiveness of the treatment increased in that either the catalyst module itself is moved or in that the reaction liquid is regularly moved, which latter can be achieved in a simple manner by agitating mechanisms or wet-pit pumps. If the catalyst is to be moved, this would preferably take place in the longitudinal direction of the conduits in the honeycomb catalyst or in the longitudinal direction of the plates as a lifting movement that can be produced, e.g., in that the module is suspended on a crane and appropriately moved. The effectiveness of the treatment can be increased and the processing time consequently shortened basically in that the module is exposed to low-frequency oscillations of the reaction liquid or to ultrasound. The ultrasound should preferably be used at a frequency in the range of 10,000 to 100,000 Hz or the low-frequency oscillation should be used in a range of 20 to 1000 Hz. The treatment with ultrasound results in a wave-local movement of the liquid on the catalytic surface and in the formation of cavitations, which favors the dissolution of any blocking layers still presenting the dissolution of iron compounds from the ceramic material.

A bipartite method proved to be an especially advantageous operating variant in which the catalyst module is subjected to a primary treatment with the reaction liquid during movement of the modules and/or of the surrounding liquid, preferably with lifting or agitating movements and in which the module is then transferred into the ultrasonic basin where it is immersed in a reaction liquid of the same composition and sonicated. The contaminated reaction liquid in the first basin can then either be reused or purified by filtration as a function of the degree of contamination.

After the ultrasonic treatment the catalyst module is washed several times with water and then dried, e.g., by hot air at 50 to 400° C.

Since the transitional metallic oxides functioning as activators and/or active centers are soluble up to a certain extent not only in alkalis but also in acids, another analysis should be performed at the end of the treatment in order to determine the content of transitional metals. If the discharge of activators during the regeneration resulted in a reduction of the content of transitional metals, a re-impregnation to the desired content can take place immediately by adding an appropriate aqueous solution and by a subsequent drying.

It is possible with the method of the invention to completely regenerate the previously non-"treatable" denox catalysts, that result in an elevation of the $SO_2/SO_3$ conversion rate, up to an activity corresponding to catalysts that are new from the factory or even somewhat greater.

The invention will be explained in detail in the following using the examples:

EXAMPLE 1

The catalyst largely freed of fly ash by a preparatory step is adjusted in the dry state in a sulfuric acid solution with a pH of 1.9 containing 5 g/l ascorbic acid and a surfactant addition of 0.05 wt. % at a temperature of 20° C. The reaction solution is recirculated in the container by a wet-pit pump.

The catalyst remains 4 hours in the basin with the reaction solution. The module is then removed from the container, washed and dried and optionally re-impregnated.

EXAMPLE 2

The mechanically pretreated catalyst is adjusted in the reaction solution described in example 1 and the reaction solution heated to 60° and recirculated by a wet-pit pump. The module remains 25 minutes in the reaction solution. It is then removed and treated further in the described manner.

EXAMPLE 3

The catalyst pretreated in the described manner is adjusted in a sulfuric acid solution with a pH of 1.9 that contains the indicated surfactant addition and 15 g/l ascorbic acid at a temperature of 60° C. The catalyst is moved in the container by a lifting mechanism. An ultrasonic treatment with an energy density of 3 W/l takes place at the same time. The catalyst remains 20 minutes in the basin and is then further treated in the described manner after the end of the treatment.

EXAMPLE 4

The catalyst module is treated with the reaction solution according to example 1 and remains 12 hours in the corresponding basin. After the passage of this time the catalyst is removed and adjusted in another basin in a sulfuric acid solution with a pH of 1.9 that contains 15 g/l ascorbic acid at a temperature of 60° and moved in the container by a lifting mechanism. An ultrasonic treatment with an energy density of 3 W/l takes place at the same time. The further treatment is terminated after 20 minutes and the module is removed and washed in the customary manner and treated further.

EXAMPLE 5

The mechanically pretreated catalyst is adjusted in a dry state in a sulfuric acid solution with a pH of 2.0 that contains 10 g/l ascorbic acid and surfactants at a temperature of 60° C. during which the solution is recirculated in the basin by a wet-pit pump and the catalyst is moved by a lifting mechanism. At the same time an ultrasonic irradiation takes place with an energy density of 3 W/l. After 30 minutes the module is removed from the basin, washed with water and treated further as described.

EXAMPLE 6

The catalyst, that was pre-treated mechanically and for the removal of alkali oxides, arsenic and phosphorus in a known manner and subsequently dried, is adjusted in a sulfur solution with a pH of 1.9 containing 10 g/l ascorbic acid and 0.02 wt. % non-ionic surfactants at a temperature of 22° C. and remains in the moved reaction solution for 4 hours. The catalyst is then removed, washed in the described manner and treated further.

EXAMPLE 7

The catalyst module is treated as described in example 1 and the dilute sulfuric acid has an addition of 7 g/l hydroquinone instead of ascorbic acid.

EXAMPLE 8

The catalyst module is treated as described in example 1 and 5 g/l gallic acid are added to the dilute sulfuric acid.

In the methods described in the examples a regeneration, even without method optimization, of over 95% is achieved in comparison to catalysts that are new from the factory that can be increased by re-impregnation to 100% or even greater.

The invention claimed is:

1. A method for regenerating denox catalyst having an accumulation of iron compounds thereon, comprising the steps of:

treating the denox catalyst with a substantially aqueous acidic solution with an addition of at least one antioxidant, wherein at least one inorganic or organic acid is used to confer acidity and the at least one acid is selected from the group consisting of $H_2SO_4$, HCl, $H_3PO_4$, $HNO_3$, oxalic acid, citric acid, malonic acid, formic acid, chloroacetic acid, and benzene sulfonic acid, and the at least one antioxidant is selected from the group consisting of substituted phenols, hydroquinones, catechols, aliphatic mercapto compounds, araliphatic mercapto compounds, aromatic mercapto compounds, dithiocarbonates, hydroxycarboxylic acids, enediols, phosphites, and phosphonates, including salts, esters and metal complexes thereof; and removing at least a portion of the iron compounds accumulated on the denox catalyst so as to regenerate the denox catalyst.

2. The method according to claim 1, wherein the aqueous acidic solution has a pH of 0.5 to 4.0.

3. The method according to claim 1, wherein the aqueous acidic solution contains at least one enediol selected from the group consisting of ascorbic acid and isoascorbic acid.

4. The method according to claim 1, wherein the aqueous acidic solution contains at least one anionic, cationic, amphoteric, non-ionic or zwitterionic surfactant.

5. The method according to claim 1, wherein the antioxidant content is 0.2 to 2.0 wt. %.

6. The method according to claim 1, wherein treatment is at a temperature of from ambient temperature to 100° C.

7. The method according to claim 1, further comprising moving the catalyst, the solution, or both, during treating.

8. The method according to claim 7, wherein the catalyst is moved by lifting, the solution is moved by agitation or recirculation, or both the catalyst and solution are moved by lifting and agitation or recirculation, respectively.

9. The method according to claim 1, further comprising treating the catalyst with an ultrasonic treatment or treating the catalyst with low-frequency oscillations in the solution or both.

10. The method according to claim 9, wherein the catalyst is treated with a low-frequency oscillation in a range from approximately 20 to 1000 Hz or ultrasound in a range from 10,000 to 100,000 Hz.

11. The method according to claim 9, wherein the treatment with solution and the ultrasonic treatment are carried out successively in separate basins.

12. The method according to claim 1, further comprising subjecting the catalyst to a mechanical pretreatment so as to remove dust, subjecting the catalyst to a pretreatment with water, or both.

13. The method according to claim 1, further comprising, after the treatment with solution, washing the catalyst with water, and drying the catalyst.

14. The method according to claim 13, further comprising, after drying, re-impregnating activator elements into the denox catalyst.

* * * * *